United States Patent
Marchesini

(10) Patent No.: US 8,151,702 B2
(45) Date of Patent: Apr. 10, 2012

(54) DEVICE FOR DEHUMIDIFYING AND COMPACTING SOLIDS CONTAINED IN SEWAGE FOR DISPOSAL

(75) Inventor: Vainer Marchesini, San Prospero (IT)

(73) Assignee: WAM Industriale S.p.A, Modena (IT)

( * ) Notice: Subject to any disclaimer, the term of this patent is extended or adjusted under 35 U.S.C. 154(b) by 383 days.

(21) Appl. No.: 12/526,009

(22) PCT Filed: Feb. 8, 2007

(86) PCT No.: PCT/IT2007/000084
§ 371 (c)(1),
(2), (4) Date: Aug. 5, 2009

(87) PCT Pub. No.: WO2008/096381
PCT Pub. Date: Aug. 14, 2008

(65) Prior Publication Data
US 2010/0006491 A1 Jan. 14, 2010

(51) Int. Cl.
*B30B 9/12* (2006.01)
*B30B 15/00* (2006.01)

(52) U.S. Cl. .......................... 100/117; 100/127; 100/147

(58) Field of Classification Search .................. 100/110, 100/111, 116, 117, 126, 127, 145, 146, 147, 100/148, 150
See application file for complete search history.

(56) References Cited

U.S. PATENT DOCUMENTS

| 3,033,249 | A | * | 5/1962 | Tamm | 141/369 |
| 3,333,679 | A | | 8/1967 | Zimmermann et al. | |
| 3,533,510 | A | | 10/1970 | Glowacki | |
| 4,260,488 | A | | 4/1981 | Condolios | |
| 4,377,108 | A | | 3/1983 | Rais | |
| 5,156,872 | A | * | 10/1992 | Lee | 426/489 |
| 5,611,268 | A | * | 3/1997 | Hamilton | 100/50 |
| 2008/0028952 | A1 | * | 2/2008 | Duperon | 100/106 |

FOREIGN PATENT DOCUMENTS

| EP | 0 003 806 A1 | 9/1979 |
| EP | 1 053 862 A1 | 11/2000 |
| GB | 1 101 253 A | 1/1968 |
| GB | 1 257 959 A | 12/1971 |

* cited by examiner

*Primary Examiner* — Jimmy T Nguyen
(74) *Attorney, Agent, or Firm* — Pearne & Gordon LLP

(57) ABSTRACT

The device for dehumidifying and compacting solids contained in sewage for disposal, is designed to be applicable to machinery (1) comprising: a tubular screen (2) having at least an inlet (4) for a product to be separated, at least an outlet (5) for a separated solid part, and at least a filtering wall (3) through which the separated liquid part exits; a transport organ (7) predisposed internally of the screen (2) for transporting the solid part to be compacted towards the outlet (5). The device comprises a contrast element (9), predisposed at the outlet (5) for interacting contactingly with the product, which in a rest position thereof occupies at least a part of a mouth of the outlet (5) and which, under an effect of a pushing action of the product to be compacted, can elastically deform in order to increase a size of a free mouth of the outlet.

5 Claims, 1 Drawing Sheet

DEVICE FOR DEHUMIDIFYING AND COMPACTING SOLIDS CONTAINED IN SEWAGE FOR DISPOSAL

TECHNICAL FIELD

The invention relates to a device for dehumidifying and compacting solids contained in sewage for disposal.

The invention is particularly applicable in plants for sewage treatment and for purification of discharge waters in urban contexts; however, the invention can be used in all processes where solids dispersed in a liquid are to be separated, resulting in a final solid product containing the least possible amount of liquid.

BACKGROUND ART

For some time the prior art has included machines in which, through a variously-shaped inlet, a liquid-solid mixture is introduced in which a transport organ, generally an Archimedes screw, rotates internally of a screen in order to transport the solid parts towards an outlet, while allowing the liquids to pass through the holes in the screen.

The solid parts arrive in proximity of the outlet, pushed by the transport organ, with a considerable amount of liquid still in them; it is therefore necessary to compact the material further in order to extract the greatest possible quantity of liquid therefrom, as well as to have as dry a material as possible exiting the machinery.

In order to perform this operation devices are generally used which are provided with heavy mobile walls which occlude the outlet and which are distanced therefrom, with an axial or rotary motion, by the material being pushed by the transport organ towards the outlet; the material which, in order to exit, pushes against the mobile wall and is compacted, the residual part of liquid still contained therein being removed.

The mobile walls in known devices, usually realised with metal sheets of various shapes, as well as being very heavy and therefore unwieldy also require connection systems to the machinery on which they are mounted, which systems must provide the guided movement of the mobile walls, generally in an axial direction or rotating about a fixed axis; levers of various types are therefore used to enable a distancing or nearing axial motion of the mobile wall from the outlet, or hinging systems to enable the mobile wall to be rotated, generally about an axis which is external of the outlet hole, from a position in which the mobile wall is facing the outlet to a position in which the mobile wall is raised by the outlet. The latter system, less complex than the former system, does not enable a homogeneous compaction of the material over the whole area of the outlet hole.

Further, all of the above-mentioned connection and movement systems constitute a complication and a cost increase in the construction of the devices; further, their maintenance and eventual replacement is neither easy nor rapid.

SUMMARY OF THE INVENTION

The aim of the present invention is to obviate the above-described drawbacks by providing a device which is constructionally simple and economical, and easy to maintain and replace.

An advantage of the invention is that it realises a device in which the residual humidity in the exiting solid part is very limited and in any case distributed homogenously.

A further advantage of the invention is that it provides a device exhibiting a very small axial dimension, and is easily applicable to known-type machinery.

These aims and advantages and more besides are all attained by the invention as it is characterised in the accompanying claims.

BRIEF DESCRIPTION OF THE DRAWINGS

Further characteristics and advantages of the present invention will better emerge from the detailed description that follows, of a preferred but not exclusive embodiment of the invention, illustrated purely by way of non-limiting example in the accompanying figures of the drawings, in which.

DETAILED DESCRIPTION OF THE INVENTION

Figure 1:
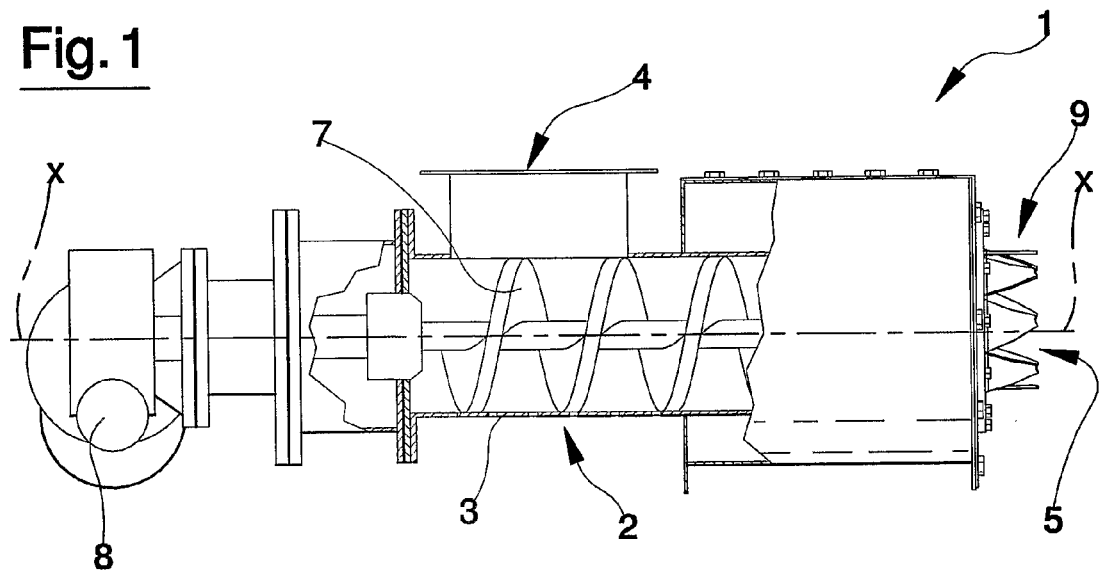
FIG. 1 is a schematic side view, with some parts removed better to evidence others, of a machine using the device of the invention.
Figure 2:
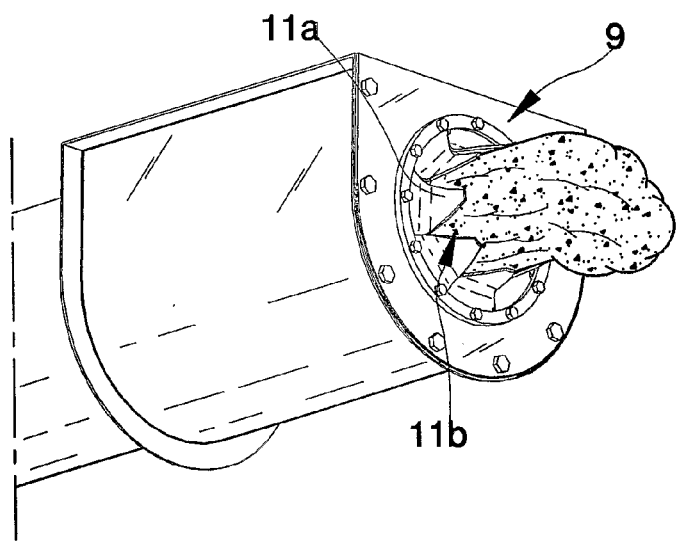
FIG. 2 is a perspective view of a detail of the device, applied to the machine of FIG. 1, in a conformation enabling outlet of the compacted solids.

With reference to the figures of the drawings, 1 denotes in its entirety a device for separating a solid part of a product from a liquid part thereof. The device can be usefully applied in a livestock-raising establishment to separate the solid part and the liquid part of the animals' waste products.

The device comprises a screen 2 having at least a perforated tubular wall 3 with at least an inlet 4 for the product to be separated and at least an outlet 5 for the solid part thereof. The screen 2 is substantially cylindrical with a horizontal axis x-x. The liquid part exits the screen through the perforations in the tubular filtration wall and is evacuated from a special outlet therefor, not illustrated.

A rotatable transport organ 7 located internally of the screen 2 transports the humid product to undergo separation towards the outlet 5. The transport organ 7 is preferably a transport helix, coaxial to the screen 2 and controlled in rotation by a motor 8 which is external of the screen.

A contrast element 9 is predisposed at the outlet 5 for contactingly interacting with the product. The contrast element 9, in a rest position, occupies at least a part of the outlet hole and, pushed by the product to be compacted, can elastically deform in order to increase the size of the outlet hole.

The contrast element comprises a flat surface which is solidly connected to the machinery 1 in a position in which occupies at least a part of the outlet hole of the outlet 5. This flat surface is constituted by elements 11a,b which develop from the periphery of the outlet hole of the outlet 5 towards the centre of the hole, and towards the axis x-x. The elements 11a,b exhibit different degrees of elasticity; main elements 11a, having a predetermined elasticity, are alternated with intermediate elements 11b which have a different degree of elasticity with respect to the main elements 11a.

In the preferred embodiment of the device, the intermediate elements 11b are constituted by cuts which develop from the periphery of the outlet hole of the outlet 5 towards the centre thereof. Alternatively the intermediate elements 11b can be realised as membranes or film fixed to the two adjacent main elements 11a. The main elements 11a are preferably tapered towards the centre of the outlet hole 5 and, in a rest position thereof, are located side-by-side and are subdivided by the intermediate elements 11b or cuts.

Figure 3:
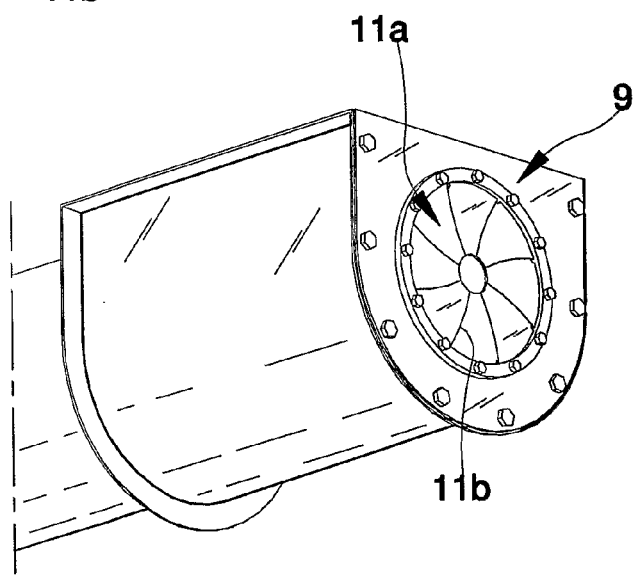
FIG. 3 is a perspective view of a detail of the device, applied to the machine of FIG. 1, in a rest position.

As can be seen in FIG. 3, in the rest position the contrast element 9 is conformed as a circularly-developing diaphragm. The main elements 11a are constrained at an end thereof to the edge of the outlet hole 5, while at the other end thereof they are free. The free ends of the main elements 11a delimit an opening, positioned coaxially or in proximity of the longitudinal axis x-x, which is open also when the diaphragm is in the rest position. Preferably the main elements 11a are made of a plastic material and can be internally provided with metal plates.

During operation, the humid product introduced into the inlet mouth 4 is transferred towards the outlet mouth 5 by the transport helix 7 which is set in rotation. The liquid part is filtered through the perforated wall 3 of the screen and is distanced through a special outlet. Under the pushing action of the transport helix 7 the solid part of the product to be treated enters into contact with the contrast elements 9. As illustrated schematically in FIG. 3, the main elements 11a deform, elastically flexing and turning the free ends thereof towards the outside of the device, so that in the deformed conformation the contrast element 9 assumes the overall shape of a funnel, coaxial to the axis x-x, which radially compresses the solid part in order to increase the percentage of the liquid part separated from the product. In the illustrated embodiment the surface of the funnel is made discontinuous by the presence of the cuts 11b which, in the deformed configuration of the contrast element 9, are dilated and have a diverging development as they distance from the device. In a case where the intermediate elements 11b are constituted by membranes or film, the surfaces of the funnel would be continuous.

The elasticity of the main elements 11a can be varied by changing the thickness of the elements 11a or by including metal plates internally of the elements 11a. The elasticity of the main elements 11a can be chosen in relation to the nature of the product to be treated. In general this choice is in the nature of a compromise between good radial compression of the product, enabling an optimum separation of the liquid part from the solid part, and a sufficient freedom of flow of product which must not be excessively obstructed by the contrast element 9.

The invention claimed is:

1. A device for dehumidifying and compacting solids contained in sewage for disposal, of a type to be applied to machinery (1), which machinery (1) comprises: a tubular screen (2) having at least an inlet (4) for a product to be separated and at least an outlet (5) for a separated solid part thereof, a liquid part thereof exiting from at least a filtering wall (3) of the screen (2); a transport organ (7) predisposed internally of the screen (2) for transporting the solid part to be compacted towards the outlet (5); wherein the device for dehumidifying comprises a contrast element (9), predisposed at the outlet (5) for interacting contactingly with the product, which contrast element (9), in a rest position thereof, occupies at least a part of a mouth of the outlet (5) and which contrast element (9), under an effect of a pushing force of the product to be compacted, can elastically deform in order to increase a size of a free mouth of the outlet, the contrast element comprising a flat surface, solidly connected to the machinery (1) at a position in which the flat surface occupies at least a part of the outlet mouth of the outlet (5), constituted by elements (11a, b) which develop from a periphery of the outlet mouth of the outlet (5) towards a centre of the outlet mouth, wherein the flat surface comprises main elements (11a) having a predetermined degree of elasticity, alternated with intermediate elements (11b), having a degree of elasticity which is different to the degree of elasticity of the main elements (11a).

2. The device of claim 1, wherein: the intermediate elements (11b) are constituted by cuts which develop from the periphery of the outlet mouth of the outlet (5) towards the centre thereof; the main elements (11a) are tapered towards the centre of the outlet mouth of the outlet (5) and, in the rest position thereof, are side-by-side and subdivided by cuts (11b).

3. The device of claim 1, wherein the main elements (11a) are made of a plastic material.

4. The device of claim 1, wherein the main elements (11a) are made of a plastic material and contain metal plates internally thereof.

5. A machine for dehumidifying and compacting solids contained in sewage for disposal, said machine having an outlet mouth (5) which is circular, said machine having a contrast element (9) which comprises a flat surface which is shaped as a circular crown, solidly connected to the machinery (1) in such a position as to occupy a circular crown of the outlet mouth (5); wherein the contrast element (9) comprises main elements (11a) which develop from the periphery of the outlet mouth (5) towards the centre thereof, the main elements (11a) having a predetermined degree of elasticity and being alternated with intermediate elements (11b) which are constituted by cuts developing from the periphery of the outlet mouth (5) towards the centre thereof; the main elements (11a) being tapered in a direction going towards the centre of the outlet mouth (5) and, in the rest position of the contrast element (9), being arranged side-by-side in order to define the circular crown; the main elements (11a) being made of a plastic material and containing metal plates internally thereof.

* * * * *